A. H. SMITH.
FASTENING FOR FREIGHT CAR COMPARTMENTS.
APPLICATION FILED JULY 29, 1920.

1,406,294.

Patented Feb. 14, 1922.
3 SHEETS—SHEET 1.

Witness

Inventor
A. H. Smith
By Edwin S Clarkson
Attorney

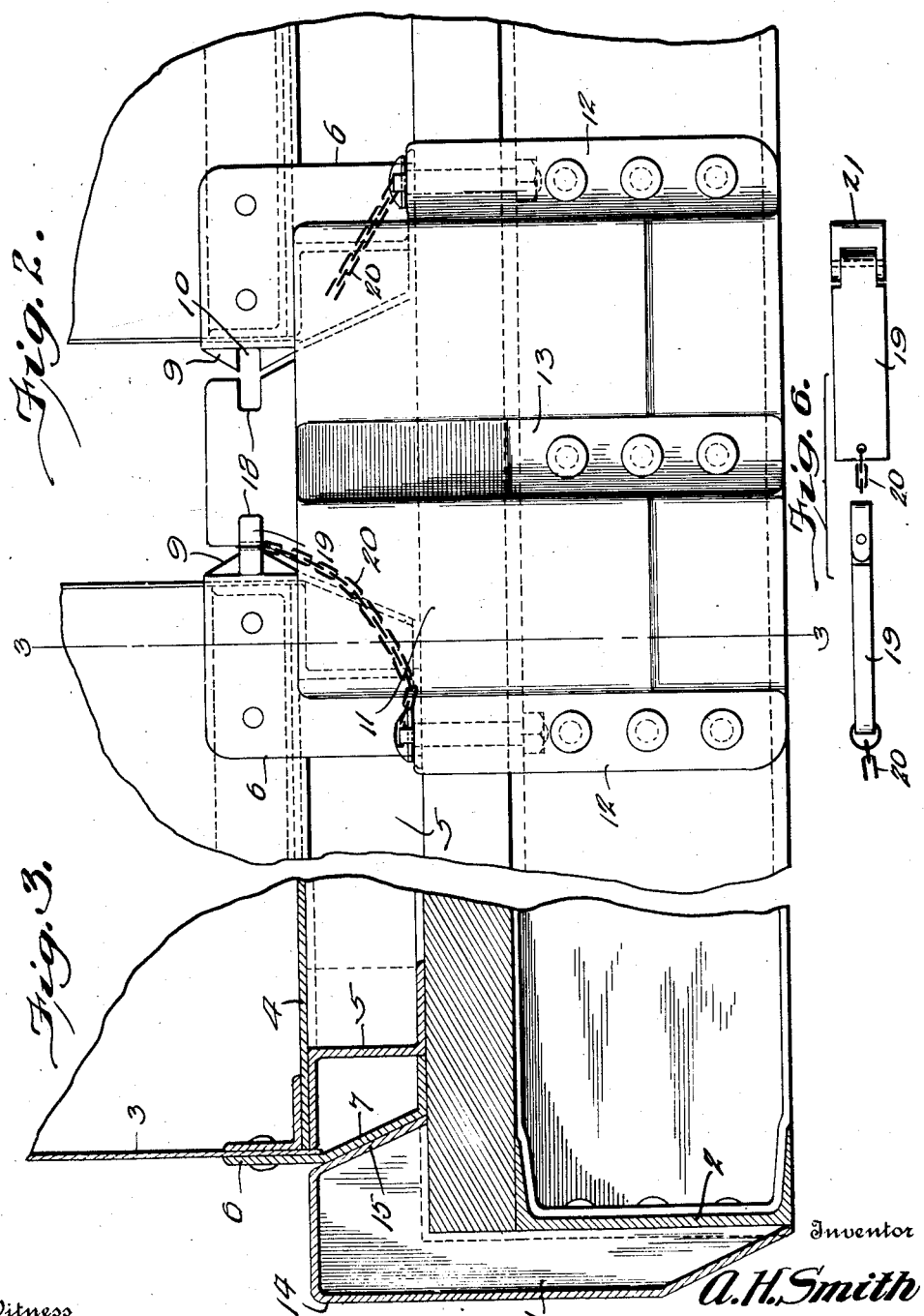

A. H. SMITH.
FASTENING FOR FREIGHT CAR COMPARTMENTS.
APPLICATION FILED JULY 29, 1920.
1,406,294. Patented Feb. 14, 1922.
3 SHEETS—SHEET 3.
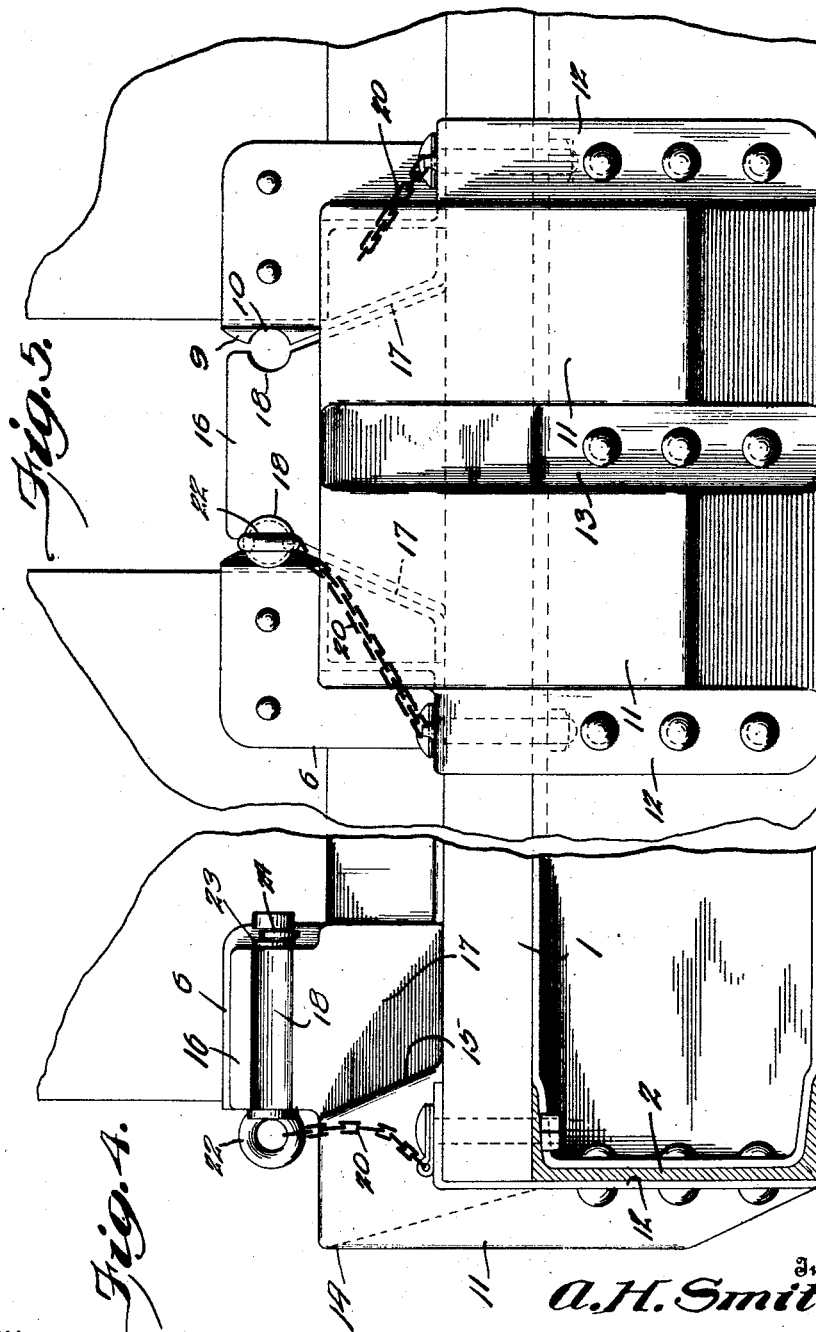

UNITED STATES PATENT OFFICE.

ALFRED H. SMITH, OF NEW YORK, N. Y.

FASTENING FOR FREIGHT-CAR COMPARTMENTS.

1,406,294.  Specification of Letters Patent.  Patented Feb. 14, 1922.

Application filed July 29, 1920. Serial No. 399,676.

*To all whom it may concern:*

Be it known that I, ALFRED H. SMITH, a citizen of the United States, residing at New York city, in the State of New York, have invented certain new and useful Improvements in Fastenings for Freight-Car Compartments, of which the following is a description.

One of the great sources of loss to railroad systems is theft of freight in transit and at the terminals, I have shown in another application for patent a series of independent detachable freight compartments adapted to be loaded on a single car, whereby each compartment constitutes a separate unit which may be removed from the car without disturbing the other units, and the remaining units are so loaded on the car that the doors cannot be opened while the units are on the car.

The object of the present invention is to provide means for locking the several compartments to the car and holding them against accidental displacement and shifting under service conditions.

In the drawings:

Figure 2 is an enlarged detail side elevation of a car and two adjacent compartments showing the locking joint between them and the car, one locking key being omitted.

Figure 3 is an enlarged detail sectional view on line 3—3 of Figure 2.

Figure 4 is an enlarged detail end view of a compartment on a car showing another form of lock.

Figure 5 is an enlarged detail side elevation of portions of two adjacent compartments on a car showing the joint and locking member illustrated in Figure 4.

Figure 6 is a side and top plan view of the locking key shown in Figure 2.

Figure 1:
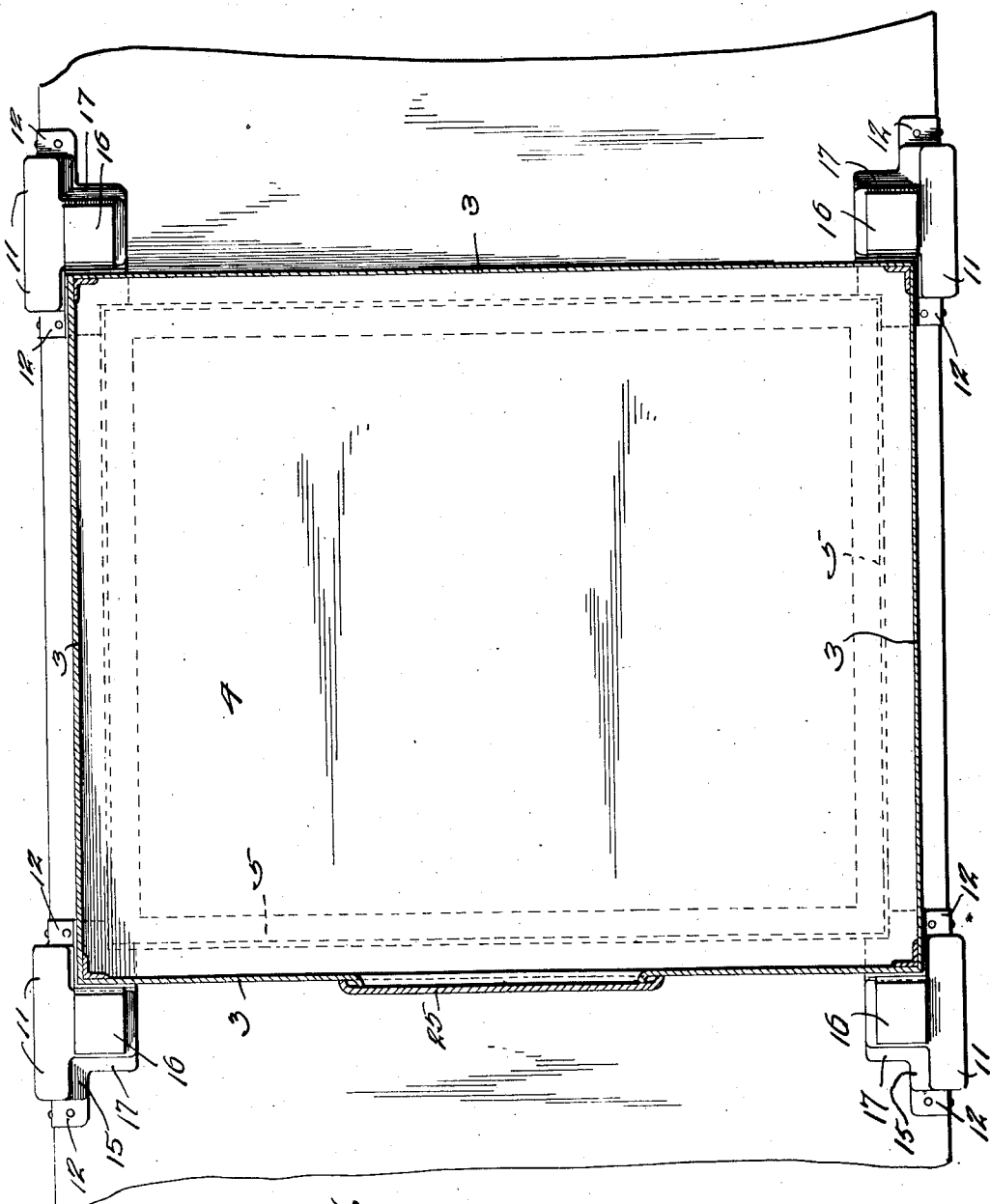
Figure 1 is a top plan view of a portion of a car with a compartment thereon, the compartment being in section.

The reference numeral 1 designates a car of any approved type, but for the purpose of illustrating my invention I have shown a flat car having the side sills 2. The compartments 3 are provided with a permanent floor 4. A Z bar 5 is suitably secured to the bottom of the compartment and functions to hold the compartment above the surface upon which it may rest thereby elevating the bottom of the compartment above any water that may accumulate on the surface on which the compartment may rest. 6 is a casting riveted to the side walls of the compartment and depending below the bottom of the same and terminating at the plane of the bottom flange of the Z bar 5 and inclined inwardly under the compartment to form a bevelled wedging face 7.

In the lower corners of the compartment I rivet the casting 6 which is provided with an outwardly extending lug 9 provided with a portion of a key-way 10 which may be of any suitable configuration to adapt it to the type of key which may be used.

A casting 11 is provided with side flanges 12 which are riveted to the side sills 2, said casting having a centered vertically disposed corrugation 13 which functions as a beam to strengthen the casting against outward thrust. Said castings being further riveted to the side sills by a series of rivets through the bottom of said corrugation. The top portion of the casting extends a material distance above the floor of the car as at 14 and is provided with an inner bevelled face 15 facing the longitudinal center line of the car. An arm or tongue 16 projects inwardly toward the longitudinal center-line of the car from the casting 11 and is provided with bevelled side walls 17 which are formed on the same angle of bevel with the bevelled faces 15 of the casting, the bevelled faces 17 and 15 meeting and merging at their juncture and forming a seat within which the bevelled faces 7 may be seated when the compartment is loaded on the car. The upper portion of the casting 11 is provided with key-ways 18 which, when the compartments are in position on the car, register with the key-ways 10 on the compartments. 19 is a key adapted to be placed in the key-ways 10 and 18 thereby locking the compartments to the castings 11 and to the car. The key 19 is secured at one end against accidental displacement or loss by a chain 20, while at its other end it is provided with a pivoted member 21 adapted to fall by gravity to a position transverse of the key-way after the key is in position thereby locking the key in the key-way against accidental displacement. Another form of gravity lock is shown in the drawings wherein the key 22 is provided with the circumferential groove 23 in which is loosely mounted a ring 24 whereby the ring is free to drop by gravity after the key is in place in the key-way to a position transverse of the key-way thereby preventing the key from withdrawing from the key-way outwardly. As stated the key and key-way may be of any desired configuration and perimeter.

Of course it will be understood that the compartments are provided with suitable doors 25 which have suitable locking means.

What I claim is:

1. In a car, a series of castings secured to the side sills of the car and projecting above the floor of the car and having oppositely disposed bevelled faces above the floor of the car, a portion of a key seat formed near the top of each bevelled face, a series of detachably mounted freight compartments on said car spaced from each other with the upper ends of said castings positioned between adjacent compartments said compartments having bevelled faces at the bottom adapted to engage the bevelled faces of the castings whereby the compartments are centered to their respective positions on the car, a portion of a key seat carried by each compartment registering with the key seat on the castings when in position on the car and a key adapted to enter said key seats and bridge the joint between them and lock the compartments to the car.

2. In a car, the combination with a series of independent freight compartments mounted on the car, a portion of a key-way on each compartment, of a casting secured to the side sills provided with portions of key-ways and projecting between adjacent compartments and a key entering said key-ways and bridging the joint between them and locking the compartments to the casting.

3. In a car, the combination with a series of independent freight compartments mounted on the car, a portion of a key-way on each compartment, of a casting secured to the side sills provided with a portion of key-ways and projecting between adjacent compartments and keys entering said key-ways and bridging the joint between them and locking the compartments to the casting, and gravity locks on said keys to hold the same in said key-ways against accidental displacement.

4. In a freight car, a series of independent freight compartments mounted on said car and having inwardly bevelled lower corners, of a casting secured to the side sills of the car and projecting above the floor of the car, a tongue extending inwardly between two adjacent compartments the side walls of said tongue and inner face of said casting being downwardly and outwardly bevelled to form a pocket to receive the lower bevelled corners of the compartment, key-ways on the said tongue and compartments and a key in said ways and bridging the joint between said ways, whereby the compartments are locked to said castings and to the car.

5. In a freight car, a series of independent freight compartments mounted on said car and having inwardly bevelled lower corners, of a casting secured to a side sill of the car and projecting above the floor of the car, a tongue extending inwardly between two adjacent compartments the side walls of said tongue and inner face of said casting being downwardly and outwardly bevelled to form a pocket to receive the lower bevelled corners of the compartments, key-ways on the said tongue and compartments and keys in said ways and bridging the joints between said ways, whereby the compartments are locked to said castings and to the car, and gravity locks on said keys to hold the keys in said key-ways against accidental displacement.

In testimony whereof I affix my signature.

ALFRED H. SMITH.